United States Patent
Fiebig et al.

(10) Patent No.: US 9,229,787 B2
(45) Date of Patent: Jan. 5, 2016

(54) METHOD AND SYSTEM FOR PROPAGATING MODIFICATION OPERATIONS IN SERVICE-ORIENTED ARCHITECTURE

(71) Applicant: SOFTWARE AG, Darmstadt (DE)

(72) Inventors: Thorsten Fiebig, Mannheim (DE); Daniel Adelhardt, Bockhorn (DE); Gary Woods, Seeheim (DE)

(73) Assignee: SOFTWARE AG, Darmstadt (DE)

( * ) Notice: Subject to any disclaimer, the term of this patent is extended or adjusted under 35 U.S.C. 154(b) by 330 days.

(21) Appl. No.: 13/782,363

(22) Filed: Mar. 1, 2013

(65) Prior Publication Data
US 2014/0173633 A1   Jun. 19, 2014

(30) Foreign Application Priority Data
Dec. 13, 2012   (EP) ..................................... 12196917

(51) Int. Cl.
| | | |
|---|---|---|
| *G06F 3/00* | (2006.01) |
| *G06F 9/44* | (2006.01) |
| *G06F 9/46* | (2006.01) |
| *G06F 13/00* | (2006.01) |
| *G06F 9/52* | (2006.01) |
| *G06F 21/62* | (2013.01) |

(52) U.S. Cl.
CPC .............. *G06F 9/52* (2013.01); *G06F 21/6218* (2013.01); *G06F 2221/2145* (2013.01)

(58) Field of Classification Search
None
See application file for complete search history.

(56) References Cited

U.S. PATENT DOCUMENTS

| | | | |
|---|---|---|---|
| 5,335,346 A | 8/1994 | Fabbio | |
| 7,076,557 B1* | 7/2006 | LaMacchia et al. | 709/229 |
| 7,512,578 B2* | 3/2009 | Abnous et al. | 706/47 |
| 2005/0096966 A1* | 5/2005 | Adi et al. | 705/10 |
| 2006/0294051 A1* | 12/2006 | Kapadia et al. | 707/1 |
| 2006/0294578 A1* | 12/2006 | Burke et al. | 726/2 |
| 2007/0038979 A1* | 2/2007 | Oral | G06F 9/4426 717/108 |
| 2007/0174031 A1* | 7/2007 | Levenshteyn et al. | 703/13 |

(Continued)

FOREIGN PATENT DOCUMENTS

| | | |
|---|---|---|
| WO | 2005/064429 | 7/2005 |
| WO | 2008/046888 | 4/2008 |

OTHER PUBLICATIONS

Curbera, Component Contracts in Service-Oriented Architectures, IEEE 2007, pp. 74-80.*

(Continued)

*Primary Examiner* — Diem Cao
(74) *Attorney, Agent, or Firm* — Nixon & Vanderhye P.C.

(57) ABSTRACT

Certain example embodiments relate to techniques for propagating modification operations for Service-oriented Architecture (SOA) objects in a SOA. The SOA includes at least two SOA objects that are connected by at least one relationship that defines one SOA object as referencing SOA object and another SOA object as referenced SOA object. Steps of an appropriate may include: receiving a request for propagating a modification operation from the referencing SOA object to the referenced SOA object; evaluating at least one propagation rule to determine whether the requested modification can be performed on the referenced SOA object; and if it is determined that the requested modification cannot be performed in accordance with the at least one propagation rule, evaluating at least one approval rule to determine whether the requested modification can be performed on the referenced SOA object.

19 Claims, 3 Drawing Sheets

(56) References Cited

U.S. PATENT DOCUMENTS

| | | | |
|---|---|---|---|
| 2007/0255685 A1 | 11/2007 | Boult et al. | |
| 2009/0024652 A1 | 1/2009 | Thompson | |
| 2010/0125618 A1* | 5/2010 | Dutta | G06F 8/10 707/822 |

OTHER PUBLICATIONS

[Online], Wikipedia Search—Service-oriented architecture, http://en.wikipedia.org/wikiService-oriented_architecture, printed Feb. 26, 2013, 20 pages.

[Online], Wikipedia Search—SOA governance, http://en.wikipedia.org/wiki/SOA_governance, printed Feb. 26, 2013, 3 pages.

[Online], Websphere Service Registry and Repository, *IBM*, http://www-01.ibm.com/software/integration/wssr/, printed Feb. 26, 2013, 2 pages.

[Online], HP SOA Systinet, *HP, HP Software*, http://www8.hp.com/us/en/software-solutions/software.html?compURI=1173936, printed Feb. 26, 2013, 6 pages.

Reiner Kraft, "Designing a Distributed Access Control Processor for Network Services on the Web," ACM Workshop on XML Security, Nov. 22, 2002.

Sushil Jajodia, "Flexible Support for Multiple Access Control Polices," ACM Transactions on Database Systems, vol. 26, No. 2, Jun. 2001, pp. 214-260.

Microsoft—Windows Server, "How Permissions Work" [retrieved Jun. 25, 2013].

\* cited by examiner

METHOD AND SYSTEM FOR PROPAGATING MODIFICATION OPERATIONS IN SERVICE-ORIENTED ARCHITECTURE

This application claims priority to EP 12 196 917.4 filed 13 Dec. 2012, the entire content of which is hereby incorporated by reference.

1. TECHNICAL FIELD

Certain example embodiments relate to a method and system for propagating modification operations for Service-oriented Architecture (SOA) objects in a SOA.

2. BACKGROUND AND SUMMARY

Service oriented architecture (SOA) is an architecture paradigm for large and complex distributed computing systems. The paradigm allows for the development, operation and control of complex distributed systems by splitting monolithic applications into components, services, or other SOA objects that can be re-used and orchestrated to get new functionality on demand. SOA objects can be connected to each other via relationships. Nowadays, complex systems are set up, comprising a huge set of relationships. In addition to SOA objects and relationships, a SOA typically comprises a SOA registry for the management of SOA objects and their dependencies. Further, SOA governance is responsible for controlling correct operations in a SOA. Operations for example comprise updating a composite relationship.

Those skilled in the art will appreciate that controlling (by SOA governance) the correct operation of a large SOA-based system is a complex and difficult task, while catastrophic impacts on the overall SOA system can arise already if one single service does not operate as expected. Given the high frequency of changes to a typical SOA, it thus has to be ensured that when a certain SOA object is updated or modified, all dependent SOA objects are updated as well in a consistent manner. For example consider a SOA system that operates a transfer system in a bank. If the referencing (source) SOA object comprises the bank account of a client as attribute and the account has been changed, the transfer might still run with the referenced (target) SOA objects conducting the transfer with obsolete bank information. In the worst case, the transferred money is lost. Therefore, it is very important to ensure that the various SOA objects of a complex SOA system are consistent at any time.

Hence, various approaches have been proposed in the prior art for controlling the correct operation of a SOA, i.e. to ensure that all participants (such as services) in the SOA operate as expected. These approaches for controlling the correct operation of a SOA are commonly referred to as "SOA governance" and include among others ensuring that all SOA components interact properly in terms of communication patterns, security rules, response times and/or other performance characteristics (quality of services), ensuring that changing a service does not impose unforeseen consequences on service consumers (change management) and/or ensuring that services evolve within the system only in a controlled manner (lifecycle management).

U.S. Pat. No. 7,512,578 B2 discloses smart containers and a definition to manage associated content without writing or modifying application code. A smart container template can represent a model including for example how items, such as items of managed content become members of a composite object of a type which the template is associated. A policy or operation specified by the definition is applied to an item, comprising the composite object, of the content.

U.S. Pat. No. 5,335,346 shows a system and method comprising an access control list for spanning across object boundaries in an object oriented database. The access control list further provides read and write access permissions and execution semantics which apply to the execution of methods in an object oriented database.

US patent application no. 2009/0024652 A1 discloses an integration server system for mapping data objects on a database schema. The system offers a strongly-typed model API, complex constraint management and association balancing. This system shows improved performance through optimized handling of ordered associations of data object and of string-valued attributes.

Further, US patent application no. 2007/0255685 A1 shows a method and system for modelling data providing a constrained design space in which data is modelled. This document discloses real world entities as objects within an object table or data store. Real world entities may include for example databases and rational links between entity objects. Relationships can be defined in a separate link database or table for referencing entity objects. This described representation of data to be modelled refers to an object hierarchy. The constrained design space allows an improved adaptation of a database in a format as one advantage.

U.S. Pat. No. 7,512,578 B2 discloses composite relationships in the context of management systems. The other above-discussed prior art approaches address a kind of system comprising objects, that may be connected with each other via relationships in databases. However, these documents do not concern service-oriented architectures with complex relationships between a vast amount of SOA objects. Therefore, the above-described prior art lacks ways for ensuring the consistency and security in a SOA system.

It is therefore the technical problem underlying certain example embodiments to provide an approach to guarantee the consistency of SOA objects in a SOA in a flexible and useable way in that SOA governance remains unaffected, thereby at least partly overcoming the above explained lacking aspects of the prior art.

This problem is according to one aspect solved by a method for propagating modification operations for Service-oriented Architecture (SOA) objects in a SOA, wherein the SOA comprises at least two SOA objects connected by at least one relationship which defines one SOA object as referencing SOA object and another SOA object as referenced SOA object. In the embodiment of claim 1, the method comprises the following steps:

a. receiving a request for propagating a modification operation from the referencing SOA object to the referenced SOA object;

b. evaluating at least one propagation rule to determine whether the requested modification can be performed on the referenced SOA object;

c. if it is determined that the requested modification cannot be performed in accordance with the at least one propagation rule, evaluating at least one approval rule to determine whether the requested modification can be performed on the referenced SOA object.

Accordingly, the embodiment defines a method for propagating modification operations between at least two connected SOA objects. The at least two SOA objects are connected by at least one relationship which defines one SOA object as referencing SOA object and another SOA object as referenced SOA object. Typically at least three types of relationships can be considered: Simple association relationship, aggregation relationship and composite relationship.

Importantly, whenever a request for propagating a modification operation from the referencing SOA object to the referenced SOA object has been received (which may be triggered automatically by the system each time the referencing SOA object is modified), it has to be ensured, that the propagation is possible using at least one propagation rule. Certain example embodiments provide further rules for the case that the requested modification cannot be performed in accordance with the at least one propagation rule. In that case, the at least one approval rule is essential for determining if the requested modification can be performed on the referenced SOA object. In other words, certain example embodiments provide a way to consistently propagate a modification along a relationship even though the associated propagation rule does actually not allow said propagation. In this case, an additional rule, namely the approval rule, is evaluated, and if said approval rule confirms the propagation, the propagation can eventually be performed. As a result, it is ensured that modifications to SOA objects are always performed in a consistent and secure manner in that they are correctly propagated to all affected SOA objects.

In one aspect, the modification operation comprises changing at least one permission of the referencing SOA object, updating the referencing SOA object and/or deleting the referencing SOA object. For example, the at least one permission may be a read and/or write permission assigned to at least one user and/or application. In a further aspect, the modification operation comprises updating and/or creating a new relationship.

Accordingly, various modification operations can be propagated. Permissions may include read and/or write permissions and are for example assigned to at least one user. Preferably, a user who has read and write permissions (i.e. full permissions) is capable to change or update the SOA object. For example the at least one permission can be changed or updated on the referencing SOA object by the user with full permissions. Other examples include updating attributes and/or the lifecycle of the referencing SOA object and/or deleting the referencing SOA object. Modification operations are not just allowed for existing relationships, but also comprise operations such as updating/and or creating a new relationship.

In a further aspect, the at least two SOA objects are connected by at least one composite relationship or aggregate relationship.

In a further aspect, a new composite relationship is updated and/or created and propagating a modification operation is performed from the referencing SOA object to all referenced SOA objects, comprising the new SOA relationship with at least two SOA objects.

Considering composite relationships, such relationships establish a kind of hierarchy with the at least one SOA object referencing all other SOA objects. The referenced SOA objects are dependent on the referencing SOA object. If the referencing SOA object is updated according to a modification operation, the operation is propagated to all other referenced SOA objects in the hierarchy. Hence, updating the referencing SOA object implies updating all referenced SOA objects, including the SOA objects of the new relationship in the hierarchy.

In yet another embodiment, the new SOA object, i.e. the SOA object(s) affected by the new relationship, keeps the at least one original modification operation and redundant modification operations are removed. Accordingly, the present method further ensures that the modification operations are propagated to the new SOA objects with the new objects keeping the original modification operations, such as permissions. In addition redundancies are removed that can occur during propagating modification operations. This removal of redundant modification operations may be achieved via merging or alignment of SOA objects.

In a preferred embodiment, the at least one SOA object is a web service. As will be appreciated by the person skilled in the art, the term "SOA object" as used herein generally refers to a representation of a real computing entity, wherein such representation is preferably stored in a SOA registry, e.g. in the form of a WSDL definition.

SOA objects may comprise a set of attributes, including simple attributes, classifications and/or relationship attributes. Simple attributes for example have values like id, name or version. Relationship attributes are already mentioned above, including the composite relationship as one preferred embodiment. Further SOA objects may be defined by distinct types comprising the type "web service".

In a further embodiment, the requested modification cannot be performed in accordance with the at least one propagation rule if at least one user and/or application has no write permission on the referencing SOA object.

As already explained further above the at least one user with full permissions is able to update or even delete relationships. In this case propagation of the modification operation (update or delete) is possible. However, the user might have only a read permission. In this case propagation cannot be performed.

In an aspect, detecting that the requested modification cannot be performed comprises:
  Sending a message to a user and/or application; and/or
  Storing a notification for being picked up by a user and/or application In a further aspect, the method further comprises creating a log entry if the requested modification cannot be performed in accordance with the at least one propagation rule.

In another aspect, evaluating at least one approval rule to determine whether the requested modification can be performed on the referenced SOA object comprises getting approval from a user and/or application with read and write permissions and delegating propagation of modification operations from the user and/or application with a read permission to the user and/or application with read and write permissions.

Certain example embodiments include detecting that propagation cannot be performed and storing these cases in a log. In addition if this is the case the at least one approval rule is used to obtain approval preferably from a user with sufficient permissions. Thereby propagation does not fail, but is delegated from the user with insufficient permissions to a user with sufficient permissions.

One advantage of certain example embodiments over the prior art is the support of consistency at any time, with the propagation of modification operations to referenced SOA objects. Further, undesirable requests of users with insufficient permissions are prevented supporting security aspects and in that case delegation of requests is even allowed although the user has insufficient permissions by delegation.

In a preferred embodiment of the implementation, the at least two SOA objects and/or the at least one relationship and/or the at least one propagation rule and/or the at least one approval rule are XML based and/or based on a domain specific language (DSL).

Furthermore, certain example embodiments also provide a computer program comprising instructions for implementing any of the above-described methods.

Certain example embodiments are also directed to a system for propagating modification operations for Service-oriented Architecture (SOA) objects in a SOA, wherein the SOA comprises at least two SOA objects which are connected by at least one relationship, which defines one SOA object as referencing SOA object and another SOA object as referenced SOA object, wherein the system comprises:

a. means for receiving a request for propagating a modification operation from one the referencing SOA object to the referenced SOA object;

b. means for evaluating at least one propagation rule to determine whether the requested modification can be performed on the referenced SOA object;

c. if it is determined that the requested modification cannot be performed in accordance with the at least one propagation rule, means for evaluating at least one approval rule to determine whether the requested modification can be performed on the referenced SOA object.

3. BRIEF DESCRIPTION OF THE DRAWINGS

In the following detailed description, presently preferred embodiments are further described with reference to the following figures.

4. DETAILED DESCRIPTION OF PREFERRED EMBODIMENTS

Type System and Method for Propagating Modification Operations

In certain embodiments, an extensible type system is provided which comprises assets 10, 20 (cf. FIGS. 1 and 2) and asset 10, 20 types. One common type system may be a SOA 1 and assets 10, 20 may be also commonly referred to as SOA objects 10, 20 and SOA object 10, 20 types.

Asset Types

A SOA registry manages the assets of a SOA 1 and their dependencies. Assets 10, 20 can comprise a set of attributes including simple attributes, classifications and/or relationship 30 attributes. Simple attributes may hold simple values like the asset id, asset name or asset version. The simple attribute values may have primitive data types like String, Date or Integer.

Classifications attributes can be used to classify assets 10, 20. A classification attribute preferably references a category of a taxonomy managed in the registry/repository.

Assets can be connected via relationship 30 attributes. A relationship attribute may reference one or more target assets.

In addition to attributes, assets can have a lifecycle state. The lifecycle state is preferably taken from a lifecycle managed within the registry/repository. In one embodiment, the management of lifecycle states and/or lifecycle stages may be performed in accordance with the teaching of European patent No. 1 898 345 B1 of applicant, which is titled "System for managing the lifecycle of a service oriented architecture".

Every asset 10, 20 preferably has a type. The asset type defines the asset attributes and their types. The attribute definition defines the name of the attribute and defines if an attribute is optional, required or if it is a multi-value attribute. The definition of a simple attribute provides the type of the attribute value. The definition of a classification attribute specifies from which taxonomies the categories for the attribute values can be taken.

The definition of a relationship 30 attribute comprises the possible types of assets that can be referenced. In addition the relationship 30 attribute is classified to distinguish between several types of relationships 30. In this embodiment we assume at least:

Simple association relationship
Aggregation relationship
Composite relationship

A simple association relationship 30 just establishes an association between two assets 10, 20. An aggregation relationship 30 indicates that associated asset belongs to the referencing assets 10. A composite relation goes one step further by requiring that the referenced assets 20 belongs to the referencing assets 10 and that the existence of the referenced asset 20 is bound to the existence of the referencing asset 10. The purpose of composite relationships 30 is to define composite assets 10, 20. A composite asset 10, 20 comprises a root asset that references other assets via composite relationship attributes. The referenced assets 20 are called components. The root asset and the components are supposed to behave as a single asset. For example deleting the root asset implies the deletion of all components.

Component assets can only directly belong to a single composite asset. Nested composite assets can be created by combining composite assets. The type restrictions given by an asset type are enforced via dedicated rules or policies. The policy based approach is more flexible than enforcing type constraint via schema definitions. For example the policy based approach supports assets in the registry/repository that are not strictly fulfilling the type constraints. Such assets may results from introducing type constraints on an existing set of assets. For performance reasons the type constraint is not supposed to be enforced on existing but on new assets.

Propagating a Modification Operation—Propagation Rules

To support effective design-time governance the SOA 1 registry/repository is preferably structured into organizations. The idea of defining organizational structure is not new, but taken from standard SOA 1 data models, e.g., UDDI or JAXR. An organization can represent real business units providing SOA objects such as SOA assets 10, 20. But organizations can also be defined independently of a real world business organization. An organization may have users 34, groups and assets defined within the scope of the organization.

To protect assets against unauthorized operations each asset can comprise an ACL. The ACL entries grant permission for reading or updating an asset to users 34, applications and/or groups. A user with full permission is able to delete an asset 10, 20 or to change its permissions. The owner or the creator of an asset gets per default full permissions. During the lifecycle of an asset the instance level permissions can be extended to share the asset 10, 20 with other users 34 or groups. Granting instance level permissions on a composite asset requires that the permissions are propagated from the root asset to the component assets 1.

Figure 1:
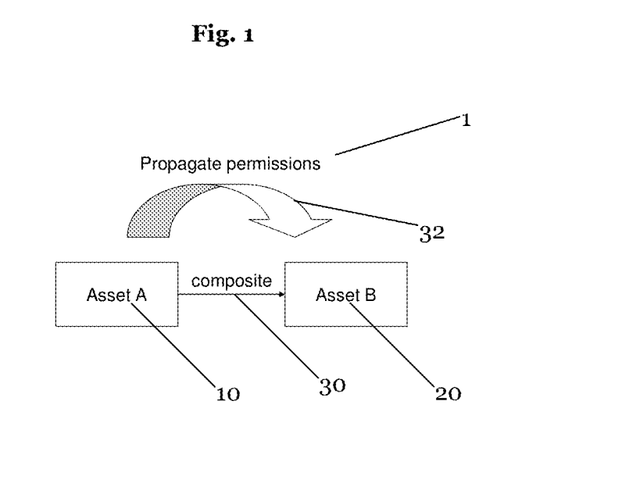
FIG. 1: A schematic diagram illustrating a method for propagating modification operations from a referencing SOA object to a referenced SOA object in a SOA, regarding a composite relationship of SOA objects in one embodiment.
Figure 2:
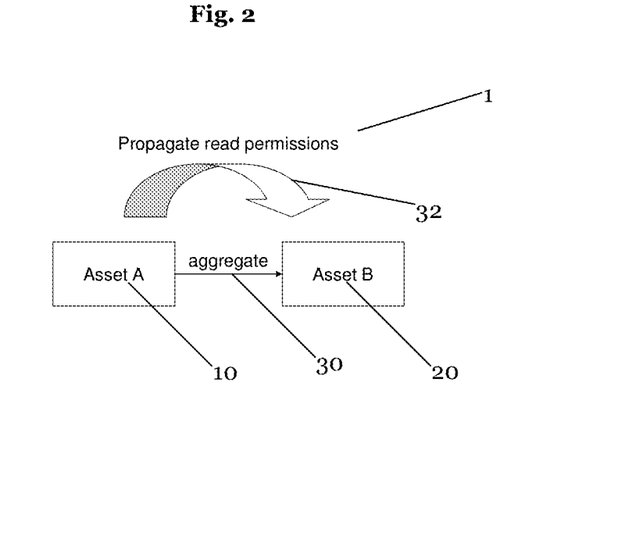
FIG. 2: A schematic diagram illustrating a method for propagating modification operations from a referencing SOA object to a referenced SOA object in a SOA, regarding an aggregate relationship of SOA objects in one embodiment.

As shown in FIG. 1 and FIG. 2. certain example embodiments provide a method for propagating a modification operation (for example permission) 32 from the referencing SOA object (as Asset A) 10 to the referenced SOA object (Asset B) 20. The method of certain example embodiments further includes propagation rules 1. For example propagating an operation 32 is performed when updating and/or creating a new relationship in one embodiment. The method for propagation 32 is shown for composite and aggregate relationships 30, separately in FIG. 1 and FIG. 2.

Without the permission propagation there would be the risk of getting inconsistent instance level permissions. For example without propagation a user 34 could have full permissions on a root asset but not on all components (i.e. child assets of the root asset). Due to this inconsistency the user 34 cannot delete the complete composite asset.

The permission propagation also needs to be performed on an existing composite asset when adding an existing asset as a new component. The new component might come with instance level permissions that are different to those of the composite asset. For adding a new component the user needs to have the full permission on the composite asset. To ensure that the user 34 is in full control of the resulting composite asset he also must have the full permission on the component he is adding. Because of the full permissions the user can propagate the instance level permission of the composite assets down to the new component. This propagation requires a merge process for the instance level permission to ensure that redundant permissions are removed. This strict alignment of instance level permissions ensures that the permissions on the root asset are effective on the extended composite asset.

The permissions of the new component are not propagated to the composite asset to avoid that the permissions of the composite asset are affected to heavily by just adding a new component. The original instance level permissions of the new component are kept to avoid breaking any existing relationships 30 pointing to the new component.

When establishing an aggregation relationship 30, as exemplified in FIG. 2 between assets 10, 20 the permission requirements are less restrictive. The user 34 that establishes the new relationship 30 only needs update permissions on the source assets 10 and read permissions on the target 20. Nevertheless the permissions on the target should also be aligned with the source of the aggregating relationship 30 to avoid permission inconsistencies. For aggregated assets it is sufficient that all read permissions of the source are propagated to the target 20. This weak alignment of permissions ensures that users 34 can at least read the full aggregated asset. The propagation of read permissions is shown in FIG. 2.

Policy Based Exception Handling

The permission propagation rules described above may be too restrictive for certain use cases. Therefore, the permission aware type system needs to provide more flexibility, i.e. it needs to allow deviations of the above rules. For example, users 34 might not be in full control of the assets 10, connected via an aggregation relationship 30. Therefore the propagation of read permissions from the source 10 to the target asset 20 might become a problem. This can be solved by applying weak permission propagation rules. Weak propagation means that instance level permissions assigned to the source of an aggregate are not propagated to the target if the user 34 does not have sufficient permissions. In the following, a sample weak propagation will be described.

Figure 3:
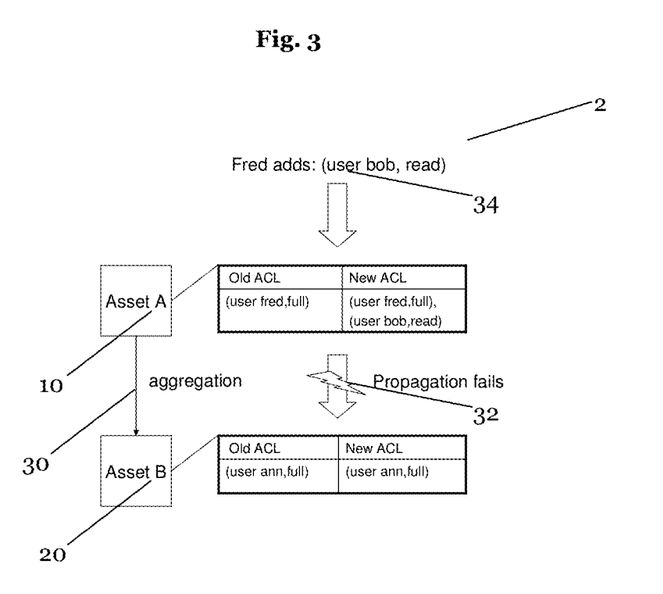
FIG. 3: A schematic representation of the method for propagating modification operations when the propagation cannot be performed, regarding an aggregate relationship of SOA objects in one embodiment.

FIG. 3 shows an Asset A 10, referencing asset B 20 via an aggregation relationship 30. Both assets 10, 20 have an access control list (ACL) holding respective permissions. User Fred wants to grant read permission to user Bob on asset A 10. The read permission can be granted on asset A 10 by Fred, but it cannot be granted on asset B 20. The reason is that Fred does not have the full permission on asset B 20. Due to the weak propagation the ACL of asset B 20 is not updated. The sample 2 shows a disadvantage of the weak propagation: Bob can read asset A 10 but cannot read the referenced assets 20. The big advantage of the delegated propagation is that permissions can be assigned even if the permissions are not sufficient to modify all ACLs of the involved assets. The weak concept can also be applied for other operations like delete.

Exceptions or weak propagations need to be processed in a controlled way to not bypass the SOA governance. For the enforcement of the permission propagation rules we assume policies being defined for the governance of association creation. These policies are fired whenever there is a new relationship 30 created, updated and/or deleted. Moreover a policy may be triggered when instance level permissions are propagated along a relationship 30 between two assets 10, 20.

The system comes in a preferred embodiment with a set of default policies enforcing the default rules for permission propagation and relationship 30 updates. To support the different types of relationship 30 attribute types there are different sets of policies to implement the default behavior.

To gain flexibility these policies can be overwritten for each asset 10, 20 type. Within an asset type itself the policies can be overwritten for each relationship 30 attribute definition separately. These policies can be specified in domain specific languages (DSL) or they can be implemented with general purpose languages like java or python. This allows triggering arbitrary actions for the controlled exception processing. Basic exception processing is to keep track of the exceptions in an audit log. The next step is to send notifications whenever there is an exception detected. These notifications can be active or passive. Active means sending a message to a user 34 or a group of users. Passive means that the notification message is just stored at a defined location waiting to be picked up by recipient of the notification. One step further is the usage of approval workflow triggering policies. This allows accepting or rejecting exceptions from the type definitions by a privileged user 36 or group.

Delegated Permission Propagation—Approval Rules

In certain embodiments, approval policies (also referred to as approval rules) can be combined with impersonation to implement delegated permission propagation 3. Delegated permission propagation 3 means that if the triggering user 34 does not have sufficient permissions an approval policy is triggered. The policy asks for the approval from a privileged user 36 (note that the term "user" is to be understood herein as a human user, an application, computer program, web service, or the like). If the user 36 gives their approval the permission propagation 32 is performed with the permissions of the approving user 36. The process of the delegated permission propagation 3 is shown by the following workflow of an approval rule after notice of a propagation failure 32 in FIG. 4.

Figure 4:
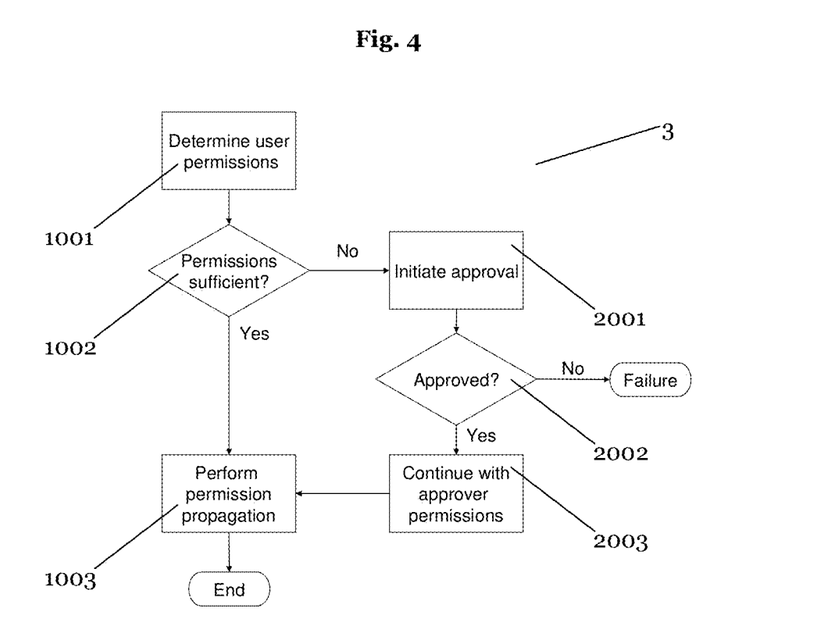
FIG. 4: A schematic diagram illustrating the workflow of an approval rule after notice of a propagation failure.

In the first step 1001 of the process the permissions of the user 34 are checked to find out if they are sufficient to perform the permission propagation 32. If the permissions are sufficient 1002 the propagation is performed 1003 with the permissions of the triggering user 34. If the permissions are not sufficient an approval process is initiated 2001. Here the approval 2002 from a more privileged group or user 36 is requested. If the approval is given the permission propagation is performed 2003 with the permissions of the approving group or user 36.

Figure 5:
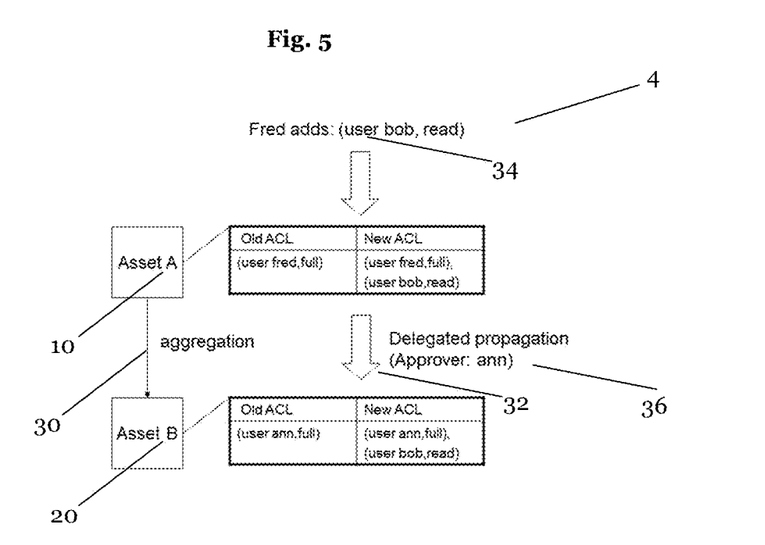
FIG. 5: A schematic representation of the method for propagating modification operations when the propagation cannot be performed, but propagation can be performed on the referenced SOA object after approval.

The delegated permission propagation 2 can be applied whenever permission propagation 32 is needed. This includes assigning instance level permissions to an asset 10, 20 and creating or updating a composite or aggregating relationship 30. By applying delegated permission propagation 2 the strict default permission requirements can be relaxed without bypassing the governance. For example a user wants to add a component to a composite asset but does not have full permissions on the composite asset 10, 20 or on the new component. With the delegated permission propagation 2 the user 34 would be able to at least initiate or request the permission propagation 32 from more privileged users 36. A corresponding scenario for two assets 10, 20 connected by an aggregation relationship is shown in FIG. 5.

Here again Fred wants to grant read permission for Bob on asset A 10. Since Fred does not have the permission to modify asset B 20 the permission propagation 32 is delegated to Ann 36. Once Ann agrees to the requested propagation Bob also gets the read permission on asset B 20.

Based on the policy based approach the delegated permission propagation 2 can be applied for a certain asset type 10, 20 or for a certain relationship within a type by just defining a delegated permission propagation policy.

The policy based delegation concept is not limited to permission propagation 32 but can also be applied for other operations like deleting or updating composite assets.

Preferred Implementation

In an exemplary implementation a simple XML based representation of assets and their type definitions is used. The following XML listing shows a sample asset 10, 20 with the name "Airport".

```
<asset id="airport-asset-id">
    <name>Airport</name>
    <type>web-service-type-id</type>
    <relationship>
        <type>has-interface-id</type>
        <target>ab35- ...</target>
    </relationship>
    <relationship>
        <type> binding-type-id</type>
        <target>ab36- ...</target>
    </relationship>
    <relationship>
        <type>import-schema-id</type>
        <target>ab37- ...</target>
    </relationship>
</asset>
```

The name element holds the name of the asset. The id attribute contains a global unique identifier (GUID). For readability reasons a pseudo GUID is used here. The type element references a type definition via its GUID. The relationship 30 element has a single type element and one or more target elements. The type element references a relationship 30 attribute definition within the asset type definition. The target element contains the GUID of the target asset. The type definition for the sample asset 10, 20 is shown below:

```
<asset-type id="web-service-type-id">
    <name>Web Service</service>
    <attributes>
        <relationship id="has-interface-id">
            <name>hasInterface</name>
            <type>Composite</type>
            <target-type>interface-type-id</target-type>
            <is-required>false</is-required>
            <is-multiple>true<is-required>
        </relationship>
        <relationship id="has-binding-id">
            <name>hasBinding</name>
            <type>Composite</type>
            <target-type>binding-type-id</target-type>
            <is-required>false</is-required>
            <is-multiple>true<is-required>
        </relationship>
        <relationship id="import-schema-id">
            <name>importSchema</name>
            <type>Aggregation</type>
            <target-type>schema-type-id</target-type>
            <is-required>false</is-required>
            <is-multiple>true<is-required>
        </relationship>
    </attributes>
</asset-type>
```

The simplified XML defines a Web Service type. It has two composite relationship 30 definitions referencing the Interface asset 10, 20 type and the Binding asset 10, 20 type. Both relationships 30 are optional, but can have multiple occurrences. In addition the Web Service type has an aggregation relationship 30 referencing the Schema asset 10, 20 type. The purpose of the relationship 30 is to associate a Web Service asset 10, 20 with the asset 10, 20 representing the necessary schema definitions. The policies for enforcing the type and permission constraints can also be defined with XML. The following sample shows a policy for performing the permission propagation 32 associated to the Web Service asset 10, 20 type definition.

```
<policy id="permission-propagation-id">
    <name>Permission Propagation</name>
    <scope>
        <type>web-service-type-id</type>
        <attribute>has-interface-id</attribute>
        <attribute>has-binding-id</attribute>
    </scope>
    <events>
        <event>Create</event>
        <event>Update</event>
    </events>
    <actions>
        <action type="java">PermissionPropagation</action>
    </actions>
</policy>
```

The scope element defines to which type and which relationship 30 attribute the policy applies to. In this sample it applies to both composite relationship 30 attributes of the Web Service asset 10, 20 type. The events element defines the events that trigger the policy. Here it is the Create and the Update event. This means the policy is triggered whenever there is a new composite relationship 30 added to a Web Service asset 10, 20 or when an existing composite relationship 30 is updated.

The policy contains a list of actions. The sample action element references a java class that implements the action performed by the policy. Beside java classes also python scripts can be specified. The policy action referenced here performs the propagation of the instance level permissions from the composite asset to the newly added component. The pseudo code of the policy action is shown by the following listing.

```
PermissionPropagationPolicy
{
  boolean action(Relationship r, Context c)
  {
    User u = c.getUser( );
    Asset trgt = r.getTarget( );
    if(not(u.hasFullPermission(trgt)))
    {
        return false;
    }
    Asset src = r.getSource( );
    if(not(u.hasFullPermission(src)))
    {
        return false;
    }
    propagatePermissions(u,src,trgt);
    return true;
  }
  void propagatePermissions(User u, Asset src, Asset trgt)
  {
      PermissionSet permissions = src.getPermissions( );
      trgt.addPermissions(u, permissions);
  }
}
```

The action checks if the user that is triggering the policy has full permissions on the new component and on the composite asset. If this is not the case the policy is failing. Otherwise the action continues by adding the instance level permissions of the composite to the new component. Setting the permissions on an asset needs to be authorized. Therefore the user 34 is passed as a parameter to the addPermissions( ) function.

To ensure that a user with insufficient permission can trigger the read permission propagation 32 when adding a Schema asset to a Web Service asset a delegated permission propagation 2 policy is needed. The policy looks as follows:

```
<policy id="read-permission-propagation-id...">
    <name>Read Permission Progation</name>
<scope>
<type>web-service-type-id</type>
<attribute> import-schema-id</attribute>
</scope>
<events>
<event>Create</event>
<event>Update</event>
</events>
<actions>
   <action type="java">InitiateApproval</action>
<action type="java">ReadPermission</action>
       </actions>
</policy>
```

The action list of the policy starts with an action that initiates an approval if the user 34 that triggers the policy does not have sufficient permissions. The approving user 36 is supposed to be an administrative user with sufficient privileges. If the approval is successful the approving user is taken to perform the second action.

To exchange user 34 information between policy actions the policy context is used. Initially the triggering user is stored in the policy context. The following sample code shows how the user information is overwritten in the context if the approval has been successfully performed.

```
InitiateApprovalPolicy
{
  boolean action(Relationship r, Context c)
  {
  User u = c.getUser( );
  if(not(u.hasFullPermission(r.getTarget( )))
  {
      Approval a = new Approval( );
      a.start( );
      if(a.isSuccessful( ))
      {
          User user = a.getApprovingUser( );
          c.setUser(user);
      }
  else
  {
     return false;
  }
  }
  return true;
  }
}
```

The following pseudo code shows how the approving user 36 is taken from the policy context and how the read permissions are propagated to the target of the relationship 30.

```
ReadPermissionPropagationPolicy
{
boolean action(Relationship r, Context c)
{
   User u = c.getUser( );
   PermissionSet permissions = r.getSrc( ).getReadPermission( );
   Asset root = src.getRootAsset( );
   root.addReadPermissions(u, permissions);
}
}
```

The sample has shown how the delegated permission propagation 32 can be implemented with simple policies attached to asset type definitions. The policies defined here delegate read permission to a new component. Other kind of permission propagations can be implemented in a similar way.

It will be appreciated that as used herein, the terms system, subsystem, service, engine, module, programmed logic circuitry, and the like may be implemented as any suitable combination of software, hardware, firmware, and/or the like. It also will be appreciated that the storage locations herein may be any suitable combination of disk drive devices, memory locations, solid state drives, CD-ROMs, DVDs, tape backups, storage area network (SAN) systems, and/or any other appropriate tangible non-transitory computer readable storage medium. Cloud and/or distributed storage (e.g., using file sharing means), for instance, also may be used in certain example embodiments. It also will be appreciated that the techniques described herein may be accomplished by having at least one processor execute instructions that may be tangibly stored on a non-transitory computer readable storage medium. For instance, a SOA may include processing resources including, for example, one or more processors, a memory, disk or other transitory or non-transitory storage, etc., which may be configured to cooperate in executing a method of the type disclosed herein.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method for propagating modification operations for Service-oriented Architecture (SOA) objects in a SOA, wherein the SOA comprises at least two SOA objects connected by at least one relationship that defines one SOA object as referencing SOA object and another SOA object as referenced SOA object, the method comprising:
   receiving a request for propagating a modification operation from the referencing SOA object to the referenced SOA object;
   evaluating at least one propagation rule to determine, based upon the at least one propagation rule and aspects of the referenced SOA object, whether the requested modification can be performed on the referenced SOA object;
   determining, using at least one processor, that the requested modification cannot be performed in accordance with the at least one propagation rule; and
   in response to the determination that the requested modification cannot be performed in accordance with the at least one propagation rule, evaluating at least one approval rule to determine whether the requested modification can be performed on the referenced SOA object, and modifying, in a memory associated with the at least one processor, the referenced SOA object in accordance with the requested modification and based on the at least one approval rule,
   wherein the evaluating at least one approval rule to determine whether the requested modification can be performed on the referenced SOA object comprises accessing the at least one approval rule in a SOA registry, wherein the at least one rule is associated in the SOA registry with a type of the referenced SOA object.

2. The method of claim 1, wherein the modification operation comprises changing at least one permission of the referencing SOA object, updating the referencing SOA object and/or deleting the referencing SOA object.

3. The method of claim 2, wherein the at least one permission is a read and/or write permission assigned to at least one user and/or application.

4. The method of claim 1, wherein the modification operation is in accordance with updating a relationship and/or creating a new relationship.

5. The method of claim 1, wherein the at least one relationship connecting the two SOA objects includes at least one composite relationship or at least one aggregate relationship.

6. The method of claim 4, wherein a composite relationship is updated and/or a new composite relationship is created and propagating a modification operation is performed from the referencing SOA object to all referenced SOA objects.

7. The method of claim 6, wherein the new composite relationship references a new SOA object, and wherein the new SOA object keeps the at least one original modification operation and redundant modification operations are removed.

8. The method of claim 1, wherein the at least one of the SOA objects is a web service.

9. The method of claim 1, wherein the requested modification cannot be performed on the referenced SOA object in accordance with the at least one propagation rule if at least one user and/or application has no write permission on the referencing SOA object.

10. The method of claim 1, wherein detecting that the requested modification cannot be performed comprises:
    sending a message to a user and/or application; and/or
    storing a notification for being picked up by the user and/or the application.

11. The method of claim 1, further comprising creating a log entry if the requested modification cannot be performed in accordance with the at least one propagation rule.

12. The method of claim 1, wherein evaluating at least one approval rule to determine whether the requested modification can be performed on the referenced SOA object comprises:
    getting approval, in accordance with the at least one approval rule, from a second user and/or application with read and write permissions to the referenced SOA object; and
    delegating propagation of modification operations from a first user and/or application with a read permission, to the second user and/or application with read and write permissions.

13. A method of claim 1, wherein any one or more of the at least two SOA objects, the at least one relationship, the at least one propagation rule, and the at least one approval rule are XML based and/or based on a domain specific language (DSL).

14. A non-transitory computer readable storage medium tangibly storing a computer program comprising instructions for implementing a method in accordance with claim 1.

15. A system for propagating modification operations for Service-oriented Architecture (SOA) objects in a SOA, wherein the SOA comprises at least two SOA objects that are connected by at least one relationship that defines one SOA object as referencing SOA object and another SOA object as referenced SOA object, wherein the system comprises at least one processor configured to perform operations comprising:
    receiving a request for propagating a modification operation from the referencing SOA object to the referenced SOA object;
    evaluating at least one propagation rule to determine, based upon the at least one propagation rule and aspects of the referenced SOA object, whether the requested modification can be performed on the referenced SOA object; and
    if it is determined that the requested modification cannot be performed in accordance with the at least one propagation rule, evaluating at least one approval rule to determine whether the requested modification can be performed on the referenced SOA object, and modifying, in a memory associated with the at least one processor, the referenced SOA in accordance with the requested modification and based on the at least one approval rule,
    wherein the evaluating at least one approval rule to determine whether the requested modification can be performed on the referenced SOA object comprises accessing the at least one approval rule in a SOA registry, wherein the at least one rule is associated in the SOA registry with a type of the referenced SOA object.

16. The system of claim 15, wherein a composite relationship is updated and/or a new composite relationship is created and propagating a modification operation is performed from the referencing SOA object to all referenced SOA objects.

17. The system of claim 16, wherein the new composite relationship references a new SOA object, and wherein the new SOA object keeps the at least one original modification operation and redundant modification operations are removed.

18. A system for propagating modification operations for Service-oriented Architecture (SOA) objects in a SOA, wherein the SOA comprises at least two SOA objects that are connected by at least one relationship that defines one SOA object as referencing SOA object and another SOA object as referenced SOA object, wherein the system comprises:

processing resources including at least one processor and a memory that cooperate in order to at least:

receive a request for propagating a modification operation from the referencing SOA object to the referenced SOA object;

evaluate at least one propagation rule and aspects of the referenced SOA object to determine whether the requested modification can be performed on the referenced SOA object; and if it is determined that the requested modification cannot be performed in accordance with the at least one propagation rule, accessing the at least one approval rule in a SOA registry, evaluating the at least one approval rule to determine whether the requested modification can be performed on the referenced SOA object, and modifying the referenced SOA in the memory in accordance with the requested modification and based on the at least one approval rule, wherein the at least one rule is associated in the SOA registry with a type of the referenced SOA object.

19. The method of claim 1, wherein the at least one propagation rule and the at least one approval rule are XML based and/or based on a domain specific language (DSL).

* * * * *